United States Patent [19]

Rardon et al.

[11] Patent Number: 5,684,072
[45] Date of Patent: Nov. 4, 1997

[54] WATERBORNE COATING COMPOSITIONS HAVING IMPROVED SMOOTHNESS

[75] Inventors: Daniel E. Rardon; Roxalana L. Martin; Dennis L. Faler, all of Pittsburgh; James E. Poole, Gibsonia, all of Pa.

[73] Assignee: PPG Industries, Inc., Pittsburgh, Pa.

[21] Appl. No.: 408,672

[22] Filed: Mar. 22, 1995

[51] Int. Cl.$^6$ .................... C08J 5/10; C08K 5/16; C08L 33/04
[52] U.S. Cl. .................... 524/199; 524/198; 524/714; 524/604; 524/839
[58] Field of Search .................... 524/198, 199, 524/714, 604, 563, 839, 210, 211, 212, 215, 227, 591, 845, 608; 523/503

[56] References Cited

U.S. PATENT DOCUMENTS

| | | | |
|---|---|---|---|
| 3,597,380 | 8/1971 | Bertini et al. | 260/29.4 |
| 3,639,455 | 2/1972 | Petersen et al. | 260/482 C |
| 3,758,432 | 9/1973 | Hopper | 260/29.6 MN |
| 3,770,684 | 11/1973 | Singer et al. | 260/29.7 NR |
| 4,147,679 | 4/1979 | Scriven et al. | 260/29.2 TN |
| 4,156,784 | 5/1979 | Dockner et al. | 560/157 |
| 4,343,925 | 8/1982 | Chang et al. | 525/440 |
| 4,403,003 | 9/1983 | Backhouse | 427/407.1 |
| 4,677,168 | 6/1987 | Hoy et al. | 525/441 |
| 5,055,542 | 10/1991 | Honel et al. | 528/45 |
| 5,071,904 | 12/1991 | Martin et al. | 524/458 |
| 5,401,790 | 3/1995 | Poole et al. | 524/199 |

FOREIGN PATENT DOCUMENTS

| | | |
|---|---|---|
| 0 196 112 | 10/1986 | European Pat. Off. . |
| 0 401 565 | 12/1990 | European Pat. Off. . |
| 2131678 | 12/1971 | Germany . |

*Primary Examiner*—George F. Lesmes
*Assistant Examiner*—U. K. Rajguru
*Attorney, Agent, or Firm*—Kenneth J. Stachel; Krisanne Shideler; William J. Uhl

[57] ABSTRACT

A waterborne coating composition having improved smoothness is provided which contains a polymeric film-forming resin in aqueous medium and from about 0.1 percent to about 10 percent by weight based on total weight of resin solids of at least one material having the following structure:

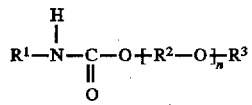

where n is an integer that is at least 1, $R^1$ is hydrogen or lower alkyl having 1 to 10 carbon atoms, $R^2$ is a divalent organic radical, and $R^3$ is an alkyl, aryl, or alkylaryl group having 1 to 20 carbon atoms.

17 Claims, No Drawings

WATERBORNE COATING COMPOSITIONS HAVING IMPROVED SMOOTHNESS

FIELD OF THE INVENTION

The present invention relates to waterborne coating compositions and, more particularly, to waterborne coating compositions having improved smoothness and improved appearance upon application to a substrate.

BACKGROUND OF THE INVENTION

An ongoing trend in the automotive industry has been to develop coating systems which provide glossy, mirror-like finishes in both solid colors and the currently popular metallic colors. This mirror-like quality of an automotive coating system is referred to as "distinctness of image", a property which is directly affected by the smoothness of the coatings. Recently, there has also been an effort in the automotive industry to reduce atmospheric emissions of volatile solvents released during the painting process. One approach to this end has been to develop waterborne coating compositions. Unfortunately, many of the waterborne coating compositions, particularly those containing metallic flake pigments, deposit as a rough film under conditions of low humidity. Although smooth films can be obtained if the humidity is controlled within narrow limits, this often is not possible in an industrial setting without considerable expense. Therefore, it would be desirable to provide a waterborne coating composition which is useful as an original finish for automobiles and which can be applied as a smooth film over a wide range of humidity conditions.

SUMMARY OF THE INVENTION

In accordance with the present invention, a waterborne coating composition is provided which comprises a polymeric film-forming resin in aqueous medium and from about 0.1 percent to about 10 percent by weight based on the total weight of resin solids of at least one material having the following structure:

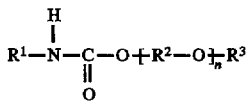

where n is an integer that is at least 1, $R^1$ is hydrogen or lower alkyl having 1 to 10 carbon atoms, $R^2$ is a divalent organic radical, and $R^3$ is an alkyl, aryl, or alkylaryl group having 1 to 20 carbon atoms.

DETAILED DESCRIPTION

The waterborne coating composition of the present invention can be any of the waterborne compositions useful in coatings applications, particularly automotive applications, as known by those skilled in the art. The waterborne coating composition of the present invention is preferably used as the colored base coat layer, to which is applied a clear top coat, in a "color-plus-clear" coating system. The coating composition comprises a polymeric film-forming resin and preferably a pigment to act as a colorant. Particularly useful polymeric film-forming resins are acrylic polymers, polyesters, including alkyds, and polyurethanes. Generally, these polymers can be any polymers of these types made by any method known to those skilled in the art where the polymers are water dispersible or emulsifiable and preferably of limited water solubility.

The polymeric film-forming resin is generally present in the coating composition in amounts of about 35 to 75 percent by weight, preferably about 40 to 60 percent by weight, based on total weight of resin solids.

Suitable acrylic polymers are copolymers of one or more alkyl esters of acrylic acid or methacrylic acid, optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Other suitable copolymerizable ethylenically unsaturated monomers generally include vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate. Acrylic polymers can be prepared via aqueous emulsion polymerization techniques and used directly in the preparation of the aqueous coating compositions or can be prepared via organic solution polymerization techniques with groups capable of salt formation such as acid or amine groups. Upon neutralization of these groups with a base or acid, the polymers can be dispersed into an aqueous medium. Generally, any method of producing such polymers that is known to those skilled in the art utilizing art recognized amounts of monomers can be used.

Where the polymer is of the crosslinking type, suitable functional monomers may be used in addition to the other acrylic monomers mentioned above and include, for example, acrylic acid, methacrylic acid, hydroxyalkyl acrylates, and hydroxyalkyl methacrylates. The coating composition in such cases contains a crosslinking agent such as an aminoplast. Other crosslinking agents such as polyisocyanates including blocked polyisocyanates may also be used. The crosslinking agent may be present in the coating composition in art recognized amounts suitable for forming a thermoset film of the polymer. Also, the acrylic polymer can be prepared with N-(alkoxymethyl) acrylamides and N-(alkoxymethyl)methacrylamides which result in self-crosslinking acrylic polymers.

Besides acrylic polymers, the polymeric film-forming resin in the coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include those derived from linseed oil, soya bean oil, tall oil, dehydrated castor oil, or tung oil.

In the case of thermosetting polyesters and alkyd resins, these polymers typically contain a portion of free hydroxyl and/or carboxyl groups which are available for further crosslinking reactions. Suitable crosslinking agents are the amine or amide-aldehyde condensates (aminoplasts) or the polyisocyanate curing agents as are well known in the art.

Polyurethanes can also be used as the polymeric film-forming resin in the coating composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

The waterborne coating composition of the present invention may be cationic, anionic, or nonionic, but preferably it is anionic. Suitable waterborne coating compositions are disclosed in U.S. Pat. No. 4,403,003 where the polymeric resinous compositions used in preparing these compositions can be used as the polymeric film-forming resin in the practice of this invention. Also, water-based polyurethanes such as those prepared in accordance with U.S. Pat. No. 4,147,679 can be used as the polymeric film-forming resin in the coating composition of the present invention. Further, it is possible to prepare an aqueous dispersion of a blend of acrylic and polyester and/or polyurethane materials in microparticulate form by a high-stress technique using a homogenizer. This technique is preferably used to prepare the coating composition of the present invention and is described in U.S. Pat. No. 5,071,904, incorporated herein by reference.

In this technique, the polymeric film-forming resin is a latex which comprises polymeric microparticles prepared by forming a mixture in aqueous medium. The mixture has an ethylenically unsaturated monomer or mixture of ethylenically unsaturated monomers with greater than 30 percent by weight of a substantially hydrophobic polymer. The percent by weight is based on the weight of ethylenically unsaturated monomer(s) and hydrophobic polymer. Most preferably, the hydrophobic polymer is essentially free of repeating acrylic or vinyl units in the polymer backbone and has a number average molecular weight of greater than about 300, as determined by gel permeation chromatography using a polystyrene standard. The hydrophobic polymer is preferably a polyester or polyurethane. The monomer(s) and hydrophobic polymer are particularized into microparticles by high-stress techniques using a homogenizer followed by polymerizing the ethylenically unsaturated monomer(s) to form polymeric microparticles which are stably dispersed in the aqueous medium. These microparticles can be internally crosslinked so as to form microgels.

As mentioned above, the waterborne coating composition of the present invention further includes from about 0.1 percent to about 10 percent, preferably about 3 to 5 percent by weight based on the total weight of resin solids of at least one material having the following structure:

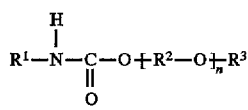

where n is an integer of at least 1. Preferably, the waterborne coating composition of the present invention contains a mixture of materials wherein n is 1, 2, and 3. $R^1$ is hydrogen or lower alkyl having 1 to 10 carbon atoms and can be aliphatic such as methyl, ethyl, propyl, or butyl; cycloaliphatic such as cyclohexyl; or aromatic such as phenyl or benzyl. $R^1$ preferably is hydrogen. $R^2$ is a divalent organic radical, for example, a divalent organic hydrocarbon radical preferably having 2 to 3 carbon atoms. $R^2$ may be linear or branched, saturated or unsaturated. $R^2$ preferably has no functional substituted groups such as hydroxyl thereon. Examples of $R^2$ include ethylene and methyl ethylene; preferably $R^2$ is an ethylene group. $R^3$ is an alkyl, aryl, or alkylaryl group having 1 to 20 carbon atoms, and can be linear or branched, saturated or unsaturated aliphatic such as methyl, ethyl, propyl, butyl, or 2-ethyl hexyl; cycloaliphatic such as cyclohexyl; or aromatic such as phenyl or benzyl; or an alkylaryl, such as a nonylphenyl, $R^3$ is preferably 2-ethyl hexyl.

The material having the structure depicted above can be prepared by reacting (i) a hydroxyl-containing glycol ether with (ii) a nitrogen-containing reactant such as a monoisocyanate, urea, including alkyl substituted urea, or a carbamate functional material.

The hydroxyl-containing glycol ether of (i) may be a linear alkyl ether of ethylene glycol, diethylene glycol, triethylene glycol, or higher ethylene glycols, propylene glycol, dipropylene glycol, or higher propylene glycols, or mixtures thereof. Suitable lower alkyl groups include linear or branched aliphatic groups such as methyl, ethyl, propyl, butyl, or 2-ethyl hexyl; cycloaliphatic groups such as cyclohexyl; or aromatic groups such as phenyl or benzyl. A preferred hydroxyl-containing glycol ether is a mixture of ethylene glycol mono-2-ethylhexyl ether, diethylene glycol mono-2-ethylhexyl ether, and triethylene glycol mono-2-ethylhexyl ether available from Eastman Chemical Co. as EKTASOLVE EEH.

Of the aforementioned nitrogen-containing reactants of (ii), suitable monoisocyanates include lower alkyl monoisocyanates having 1 to 10 carbon atoms. The monoisocyanate may be aliphatic such as methyl, ethyl, propyl, or butyl; cycloaliphatic such as cyclohexyl; or aromatic such as phenyl or benzyl. Alternatively, urea or alkyl substituted urea may be reacted with the hydroxyl-containing glycol ether of (i). Alkyl substituents include lower alkyl having 1 to 10 carbon atoms and can be aliphatic, such as methyl, ethyl, propyl, or butyl; cycloaliphatic, such as cyclohexyl; or aromatic such as phenyl or benzyl.

Preferably, the material of the present invention is prepared by a "transcarbamoylation" reaction. In this reaction, a low molecular weight carbamate functional material derived from an alcohol is reacted with the hydroxyl groups of the hydroxyl-containing glycol ether of (i), yielding a carbamate functional polyether and the original alcohol. The low molecular weight carbamate functional alcohol is first prepared by reacting the alcohol with urea or alkyl substituted urea in the presence of a catalyst to yield a carbamate functional material with the following structure:

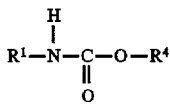

where $R^1$ is as defined above and $R^4$ is the remnant of an alcohol after reaction with a urea or alkyl substituted urea. Suitable alcohols include lower molecular weight aliphatic, cycloaliphatic, and aromatic alcohols such as methanol, ethanol, propanol, butanol, cyclohexanol, benzyl alcohol, 2-ethylhexanol, and 3-methylbutanol. Suitable catalysts include tin catalysts such as butyl stannoic acid.

The transcarbamoylation reaction may also be conducted with a low molecular weight carbamate functional material derived from a low-boiling glycol ether such as ethylene glycol methyl ether or propylene glycol methyl ether, preferably propylene glycol methyl ether. The carbamate functional glycol ether is prepared in a manner similar to the carbamate functional alcohol, by reaction with urea or alkyl substituted urea in the presence of a catalyst such as those recited above. The carbamate functional glycol ether is then further reacted with the hydroxyl-containing glycol ether of (i), transferring the carbamate functionality from the first glycol ether to the hydroxyl-containing glycol ether.

The hydroxyl-containing glycol ether of (i) is reacted with the monoisocyanate, urea or alkyl substituted urea, or carbamate functional material of (ii) in an equivalent ratio of about 2:1 to 1:2, preferably about 1:1, to yield a product which may be liquid or crystalline. The reaction conditions vary depending on the method of preparation, but generally the reaction temperature ranges from about 30° C. to 160° C.

The coating composition of the present invention preferably contains pigments to give it color. In general, the pigment is incorporated into the coating composition in amounts of about 1 to 80 percent, usually about 1 to 30 percent by weight based on total weight of the coating composition. Color pigments conventionally used in surface coatings include inorganic pigments such as titanium dioxide, iron oxide, chromium oxide, lead chromate, and carbon black; and organic pigments such as phthalocyanine blue and phthalocyanine green. Metallic flake pigmentation are also useful in waterborne compositions of the present invention. Suitable metallic pigments include, in particular, aluminum flake, copper bronze flake and metal oxide coated mica. Aluminum flake is preferred.

The material of the present invention is added to the coating composition neat; that is, it is added by itself or in other resinous ingredients, or with solvents or other diluents. Preferably, it is not added in association with the pigment or as part of the grind vehicle.

If desired, the coating composition may contain other optional materials well known in the art of formulated surface coatings. These would include crosslinking agents such as aminoplasts or polyisocyanates, surfactants, flow control agents, thixotropic agents such as bentonite clay, fillers, anti-gassing agents, organic cosolvents, catalysts, including phosphonic acids, and other customary auxiliaries. These materials can constitute up to 40 percent by weight of the total weight of the coating composition.

Coating compositions of the present invention can be applied to various substrates to which they adhere, including wood, metals, glass, cloth plastic, foam, including elastomeric substrates and the like. They are particularly useful in applying over metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity may range from about 30 to about 80 percent. The coating composition of the present invention is particularly advantageous when applied at an ambient relative humidity ranging from about 30 to about 60 percent, yielding very smooth finishes. Even at application conditions as high as 80 percent relative humidity, there is little if any deterioration in the appearance of the coating utilizing the materials of the present invention.

A film of the coating is formed on the substrate during application of the coating composition to the substrate. Typically, the coating thickness will be about 0.1 to 5 mils (2.54 to 127 microns), preferably 0.4 to 1.5 mils (10.16 to 38.1 microns) in thickness.

After application of the waterborne coating to the substrate, a film is formed on the surface of the substrate by driving water out of the film by heating or by an air-drying period. When the coating composition of the present invention is used as a base coat, the heating will preferably be only for a short period of time and will be sufficient to ensure that a topcoat such as a clear coat can be applied to the coating if desired without the former dissolving the base coat composition. Suitable drying conditions will depend on the particular base coat composition and on the ambient humidity, but in general a drying time of from about 1 to 5 minutes at a temperature of about 80°–250° F. (20°–121° C.) will be adequate to ensure that mixing of the two coats is minimized. At the same time, the base coat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for about 1 to 20 minutes.

After application of the coating composition and any desired clear coats, the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clear coat is usually from about 0.5–5 mils (12.7 to 127 microns), preferably 1.2–3 mils (30.48 to 76.2 microns).

The invention will further be described by reference to the following examples. Unless otherwise indicated, all parts are by weight.

Examples A and B illustrate the preparation of carbamate functional intermediates for use in preparing carbamate functional glycol ethers. The examples differ in the type and amount of the glycol ether component that is used.

EXAMPLES A AND B

Carbamate functional materials for use in a transcarbamoylation reaction were prepared from the following ingredients:

| Ingredients | Weight in grams | |
|---|---|---|
| | EXAMPLE A | EXAMPLE B |
| Propylene glycol methyl ether[1] | 600.0 | — |
| Diethylene glycol butyl ether[2] | — | 648.0 |
| butyl stannoic acid (BSA) | 1.60 | 1.20 |
| urea | 200.0 | 120.0 |

[1]available from Dow Chemical Co. as DOWANOL PM.
[2]available from Union Carbide Co. as Butyl CARBITOL.

In preparing both Example A and Example B, a suitable reactor was charged with the respective ingredients and heated to reflux (118° C.) with a subsurface $N_2$ sparge. Reflux was maintained until the temperature reached 140° C., about 13 hours. The temperature was held at 140° C. for 7 more hours until the urea content was below 1 percent, as determined by urea titration[1]. Excess propylene glycol methyl ether or diethylene glycol butyl ether, respectively for Example A or B, was stripped from the reaction mixture at 100° C. and 100 mm Hg. The resultant reaction product for Example A was a clear, colorless liquid which crystallized upon standing at room temperature. The resultant reaction product for Example B was a pale yellow liquid.

[1] Titration for urea was accomplished by reacting a sample with urease and potentiometrically titrating for ammonia with 0.1N hydrochloric acid. Reference: Strueli, C. A. and Averell, P. R., *The Analytical Chemistry of Nitrogen*, Wiley, N.Y. (1970).

Examples C through G illustrate the preparation of carbamate functional glycol ethers by several methods.

EXAMPLES C, D, AND E

Carbamate functional materials for use in a waterborne coating composition were prepared from the following ingredients:

| Ingredients | Weight in grams | | |
|---|---|---|---|
| | EXAMPLE C | EXAMPLE D | EXAMPLE E |
| Propylene glycol methyl ether carbamate of Example A | 270.0 | 213.0 | 186.2 |
| butyl stannoic acid (BSA) | 2.70 | 1.20 | 1.00 |
| EKTASOLVE EEH[1] | 400.0 | — | — |
| DOWANOL DPnB[2] | — | 300.0 | — |
| DOWANOL TBH[3] | — | — | 300.0 |

[1]a mixture of the 2-ethylhexyl ethers of ethylene, diethylene, and triethylene glycol, available from Eastman Chemical Co.
[2]n-butyl ether of dipropylene glycol, available from Dow Chemical Co.
[3]a mixture of the butyl ethers of triethylene glycol, tetraethylene glycol and higher ethylene glycols, available from Dow Chemical Co.

A suitable reactor was charged with the respective ingredients for each example and heated to 140° C. under an $N_2$ atmosphere. At this temperature, the pressure was gradually decreased over 4 hours to 100 mm Hg while collecting the reaction distillate. The resultant reaction product in EXAMPLE C was a yellow liquid which contained less than 2 percent residual propylene glycol methyl ether carbamate as determined by gas chromatography. The resultant reaction product in EXAMPLE D was a pale yellow liquid which contained less than 2 percent residual propylene glycol methyl ether carbamate as determined by gas chromatography. The resultant reaction product in EXAMPLE E was a yellow liquid which contained less than 2 percent residual propylene glycol methyl ether carbamate as determined by gas chromatography.

EXAMPLES F AND G

N-substituted carbamate functional materials for use in waterborne coating compositions were prepared from the following ingredients:

| INGREDIENTS | Weight in Grams | |
|---|---|---|
| | EXAMPLE F | EXAMPLE G |
| EKTASOLVE EEH | 200.0 | 200.0 |
| dibutyltin dilaurate | 0.62 | 0.60 |
| phenyl isocyanate | 115.0 | — |
| butyl isocyanate | — | 98.0 |

A suitable reactor was charged with the EKTASOLVE EEH and dibutyltin dilaurate under an $N_2$ atmosphere in the respective examples. Phenyl isocyanate (EXAMPLE F) or butyl isocyanate (EXAMPLE G) was added through an addition funnel over hours, during which time the temperature of the reaction mixture increased to 80° C. The reaction mixture was maintained at this temperature until the product could no longer be titrated for isocyanate. The resultant reaction product in EXAMPLE F was a pale yellow liquid and the resultant reaction product in EXAMPLE G was a yellow liquid.

Examples 1 through 6 illustrate the preparation of waterborne coating compositions containing carbamate functional glycol ethers in accordance with the present invention.

EXAMPLE 1 (CONTROL ADDITIVES)

A silver waterborne coating composition was prepared with the following ingredients:

| | Ingredients | Parts by weight | Solid parts by Weight |
|---|---|---|---|
| Premix 1: | Ethylene glycol monohexyl ether | 22 | — |
| | Diethylene glycol monobutyl ether | 7 | — |
| | Polypropylene glycol[1] | 12.0 | 12 |
| | TINUVIN 1130[2] | 3.5 | 3.5 |
| | Propylene glycol monopropyl ether | 3.5 | — |
| | CYMEL 322[3] | 45 | 35 |
| | Phosphatized epoxy[4] | 1.2 | 0.71 |
| | Aluminum pigment[5] | 29.4 | 19.1 |
| Premix 2: | Latex[6] | 114.3 | 48.0 |
| | polyester[7] | 6.0 | 5.0 |
| | Deionized water | 117.9 | — |
| | Shell Sol 71[8] | 6.0 | — |
| | Dimethylethanolamine, 50% in deionized water | 10.5 | — |

[1]Molecular weight 425, available from ARCO Chemicals Co.
[2]substituted benzotriazole UV light stabilizer, available from Ciba Geigy Corporation.
[3]Partially iminated melamine formaldehyde resin, available from CYTEK Industries, Inc.
[4]Phosphatized epoxy prepared from EPON 828, a polyglycidyl ether of Bisphenol A, available from Shell Oil and Chemical Co.; reacted with phosphoric acid in an 83:17 weight ratio.
[5]Chromium treated aluminum pigment at 65% solids in 15% water, 5% ethylene glycol monobutyl ether, 5% naphtha, and 10%, mineral spirits, available from Obron Atlantic Corporation under the trademark Stapa Hydrolux 400.
[6]Prepared according to U.S. Pat. No. 5,071,904, see Example I, Part A.
[7]Acid functional polyester which is the reaction product of 2,2-dimethyl-3-hydroxypropyl-2,2-dimethyl-3-hydroxypropanoate, available from Union Carbide Chemicals and Plastics Co., Inc. as ESTERDIOL 204, and methylhexahydrophthalic anhydride; having an equivalent weight of about 250.
[8]Mineral spirits, available from Shell Chemical Co.

Premixes 1 and 2 were prepared separately and Premix was added to 123.5 grams of Premix 1 under agitation. The final composition had a solids content of 32.6 percent, a pH of 8.8, and a viscosity of 24.7 seconds, measured using a #4 Ford cup.

EXAMPLES 2-6

Waterborne coating compositions were prepared generally as in Example 1, and carbamate functional materials as shown in the following table were added to Premix 2 of the compositions of the respective examples at ambient temperature with agitation in an amount equal to 4.76 percent of the total resin solids weight (including the weight of the carbamate functional material), which is equal to 5 percent "on" resin solids weight (not including the weight of the carbamate functional material; i.e., for every 100 parts by weight of resin, not including carbamate functional material, 5 parts by weight carbamate functional material is added to the coating composition).

|  | EXAMPLE: | | | | |
|---|---|---|---|---|---|
|  | 2 | 3 | 4 | 5 | 6 |
| Carbamate functional material of Example C | 4.76% | — | — | — | — |
| Carbamate functional material of Example D | — | 4.76% | — | — | — |
| Carbamate functional material of Example E | — | — | 4.76% | — | — |
| Carbamate functional material of Example F | — | — | — | 4.76% | — |
| Carbamate functional material of Example G | — | — | — | — | 4.76% |
| Solids | 33% | 33.9% | 34.9% | 32.3% | 32.5% |
| pH | 8.8 | 8.8 | 8.8 | 8.8 | 8.8 |
| Viscosity (seconds) | 24.1 | 24.6 | 24 | 23 | 23.8 |

The coating compositions of Examples 1 and 2 to 6 were spray applied in two coats to electrocoated steel panels at room temperature (67° F., 19.4° C.) and at relative humidities of 30 percent and 60 percent. After applying the second coat, a 5 minute flash was allowed before application of a clear coat available from PPG Industries, Inc. as DCT-5001. The clear coat was applied in two coats with a 90 second flash between coats. Each panel was given a 15 minute flash at room temperature and then cured for 30 minutes at 285° F. (140.5° C.).

The color-plus-clear composite coatings were evaluated for smoothness using a Taylor-Hobson Surtronic 3 Profilometer. The number reported is the average roughness ($R_A$), or the average vertical distance of any point on the surface from a centerline determined by a stylus moving across the surface, expressed in micro-inches. Lower numbers indicate greater smoothness. The results are reported in Table I below.

TABLE I

|  | 30% Relative Humidity | | 60% Relative Humidity | |
|---|---|---|---|---|
| Example: | DFT[1] | $R_A$[2] | DFT | $R_A$ |
| 1 (CONTROL) | 2.25 (57.15) | 59.5 | 2.23 (56.64) | 42.8 |
| 2 | 2.22 (56.39) | 44.8 | 2.23 (56.64) | 36.0 |
| 3 | 2.22 (56.39) | 47.0 | 2.24 (56.90) | 43.5 |
| 4 | 2.25 (57.15) | 45.5 | 2.27 (57.66) | 41.5 |
| 5 | 2.22 (56.39) | 50.0 | 2.26 (57.40) | 45.0 |
| 6 | 2.18 (55.37) | 48.0 | 2.24 (56.90) | 46.8 |

[1]Dry film thickness of base coat and clear coat, in mils (microns).
[2]Average roughness of the color-plus-clear composite coating.

The data in Table I indicates that addition of carbamate functional glycol ethers to waterborne coating compositions in accordance with the present invention markedly improves the smoothness of the resultant films when the films are applied to a substrate at 30 percent relative humidity. There is also some improvement in smoothness with the addition of unsubstituted carbamate functional glycol ethers (Examples 2-4) to waterborne coating compositions when the films are applied at 60 percent relative humidity.

Examples 7 and 8 demonstrate the differences between waterborne coating compositions containing carbamate functional glycol ethers in accordance with the present invention and waterborne coating compositions containing carbamate functional glycols.

EXAMPLES 7 and 8 (COMPARATIVE)

Waterborne coating compositions were prepared generally as in Example 1. 2-hydroxyethyl carbamate was added to Premix 2 of the composition of Example 7 and 2-hydroxypropyl carbamate was added to Premix 2 of the composition of Example 8 at ambient temperature with agitation in an amount equal to 4.76 percent of the total resin solids weight. The final composition of Example 7 had a solids content of 33.2 percent, a pH of 8.8, and a viscosity of 24.7 seconds. The final composition of Example 8 had a solids content of 33.2 percent, a pH of 8.8, and a viscosity of 24.7 seconds.

The coating compositions of Examples 1, 2, 7 and 8 were spray applied in two coats to electrocoated steel panels at room temperature (67° F., 19.4° C.) and at a relative humidity of 60 percent. After applying the second coat, a 5 minute flash was allowed before application of a clear coat, available from PPG Industries, Inc. as NCT II. The clear coat was applied in two coats with a 90 second flash between coats, at about 1.9±0.1 mil (45.7 to 50.8 microns). Each panel was given a 15 minute flash at room temperature and then cured for 30 minutes at 285° F. (140.5° C.). Coating properties are reported in Table II below.

TABLE II

| Example: | DFT[1] | $(R_A)$[2] |
|---|---|---|
| 1 (CONTROL) | 0.59 (14.99) | 27.5 |
| 2 | 0.46 (11.68) | 29 |
| 7 (COMPARATIVE) | 0.53 (13.46) | 30.8 |
| 8 (COMPARATIVE) | 0.51 (22.75) | 31.5 |

[1]Dry film thickness of base coat, in mils (microns).
[2]Average roughness of the color-plus-clear composite coating.

The data in Table II indicates that addition of carbamate functional glycols to waterborne coating compositions (Comparative Examples 7 and 8) is detrimental to the smoothness of the resultant films when the films are applied to a substrate at 60 percent relative humidity. Addition of carbamate functional glycol ethers to waterborne coating compositions in accordance with the present invention does not have such a detrimental effect.

Examples 9 through 11 illustrate the effects of carbamate functional glycol ethers at various levels in waterborne coating compositions, and Example 12 demonstrates the difference between glycol ethers and carbamate functional glycol ethers in waterborne coating compositions.

EXAMPLE 9 (CONTROL, NO ADDITIVES)

A light blue metallic waterborne coating composition was prepared with the following ingredients:

| Ingredients | Parts by weight | Solid parts by Weight |
|---|---|---|
| Premix 1: Ethylene glycol monohexyl ether | 22.9 | — |
| Diethylene glycol monobutyl ether | 7.44 | — |
| Polypropylene glycol | 7.0 | 7.0 |
| TINUVIN 1130 | 3.7 | 3.7 |
| Dimethylethanolamine, 50% in deionized water | 0.75 | — |
| Aluminum pigment as used in Example 1 above | 13.28 | 8.63 |
| Aluminum pigment[1] | 6.3 | 4.1 |
| Phosphatized epoxy | 0.87 | 0.55 |
| CYMEL 322 | 45 | 35 |
| Blue pigment[2] | 8.1 | 0.24 |
| Magenta pigment[3] | 4.14 | 0.112 |
| Black pigment[4] | 2.54 | 0.059 |
| White pigment[5] | 1.79 | 0.047 |
| Dimethylethanolamine, 50% in deionized water | 0.75 | — |
| Shell Sol 71 | 8.29 | — |
| Latex | 94 | 40.43 |
| Deionized water | 30.0 | — |
| Premix 2: Polypropylene glycol | 5.0 | 5.0 |
| Latex | 23.3 | 10.0 |
| Deionized water | 32.8 | — |
| Dimethylethanolamine, 50% in deionized water | 1.2 | — |

[1]Chromium treated aluminum pigment at 65% solids, available from Obron Atlantic Corporation under the trademark Stapa Hydrolux 500.
[2]Blue pigment available from Miles, Inc. as B-4914 Palomar Blue, dispersed in an acrylic grind vehicle (35% butyl acrylate, 30% styrene, 18% butyl methacrylate, 8.5% 2-hydroxyethyl acrylate, 8.5% acrylic acid) at a pigment to binder ratio (P/B) of 0.38.
[3]Magenta pigment available from Ciba-Geigy Corp. as Monastral Magenta RT-243D, dispersed in an acrylic grind vehicle (35% butyl acrylate, 30% styrene, 18% butyl methacrylate, 8.5% 2-hydroxyethyl acrylate, 8.5% acrylic acid) at a pigment to binder ratio (P/B) of 0.36.
[4]Black pigment available from Cabot Corp. as Monarch Black 1300, dispersed in an acrylic grind vehicle (35% butyl acrylate, 30% styrene, 18% butyl methacrylate, 8.5% 2-hydroxyethyl acrylate, 8.5% acrylic acid) at a pigment to binder ratio (P/B) of 0.28.
[5]Titanium dioxide rutile available from E. I. Du Pont de Nemours and Co., dispersed in an acrylic grind vehicle (35% butyl acrylate, 30% styrene, 18% butyl methacrylate, 8.5% 2-hydroxyethyl acrylate, 8.5% acrylic acid) at a P/B of 0.89.

Premixes 1 and 2 were prepared separately and Premix 2 was added to 256.8 grams of Premix 1 under agitation. The final composition had a solids content of 32.6 percent, a pH of 8.8, and a viscosity of 24.7 seconds, measured using a #4 Ford cup.

EXAMPLE 10

A waterborne coating composition was prepared generally as in Example 9, and the carbamate functional material of Example C was added with agitation in an amount equal to 4.76 percent of the total resin solids weight. The final composition had a solids content of 36 percent, a pH of 8.5, and a viscosity of 23.6 seconds.

EXAMPLE 11

A waterborne coating composition was prepared generally as in Example 9, and the carbamate functional material of Example C was added with agitation in an amount equal to 9.52 percent of the total resin solids weight. The final composition had a solids content of 40.7 percent, a pH of 8.5, and a viscosity of 23 seconds.

EXAMPLE 12 (COMPARATIVE)

A waterborne coating composition was prepared generally as in Example 9, and a mixture of the 2-ethylhexyl ethers of ethylene glycol, diethylene glycol, and triethylene glycol, available from Eastman Chemical Co. as EKTA-SOLVE EEH, was added with agitation in an amount equal to 4.76 percent of the total resin solids weight. The final composition had a solids content of 35.2 percent, a pH of 8.5, and a viscosity of 23.4 seconds.

The coating compositions of Examples 9–12 were spray applied as described above for Examples 7 and 8, at a relative humidity of 50 percent, followed by application of a clear coat and curing as described above for Examples 7 and 8. Coating properties are reported in Table III below.

TABLE III

| Example: | DFT[1] | Average Roughness[2] ($R_A$) |
|---|---|---|
| 9 (CONTROL) | 0.57 (14.48) | 36 |
| 10 | 0.60 (15.24) | 27 |
| 11 | 0.53 (13.46) | 20.75 |
| 12 (COMPARATIVE) | 0.55 (13.97) | 28.2 |

[1]Dry film thickness of base coat, in mils (microns).
[2]Average roughness of the color-plus-clear composite coating.

The data in Table III indicates that addition of carbamate functional glycol ethers to waterborne coating compositions in accordance with the present invention significantly improves the smoothness of the resultant films when the films are applied to a substrate at 50 percent relative humidity, with increasing effect as the level of additive increases. Moreover, the addition of non-carbamate functional glycol ethers to waterborne coating compositions (Comparative Example 12) is not as effective as the addition of carbamate functional glycol ethers for improving the smoothness of the resultant films when the films are applied to a substrate at 50 percent relative humidity.

We claim:

1. A waterborne coating composition comprising a polymeric film-forming resin in aqueous medium, pigment and from about 0.1 percent to about 10 percent based on the total weight of resin solids of at least one material having the following structure;

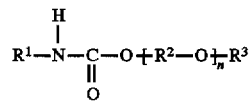

where n is an integer that is at least 1, $R^1$ is hydrogen or lower alkyl having 1 to 10 carbon atoms, $R^2$ is a divalent hydrocarbon radical, and $R^3$ is an alkyl, aryl or alkylaryl group having 1 to 20 carbon atoms.

2. The waterborne coating composition of claim 1 further comprising a crosslinking agent.

3. The waterborne coating composition of claim 1 in which $R^2$ is an ethylene group.

4. The waterborne coating composition of claim 3 wherein said material with $R^2$ as an ethylene group is present as a mixture of these materials with $R^2$ as an ethylene group, where the mixture contains material with n=1, material with n=2 and material with n=3.

5. The waterborne coating composition of claim 1 in which $R^3$ is selected from the group consisting of linear aliphatic, branched aliphatic, cycloaliphatic, and aromatic alkyl groups.

6. The waterborne coating composition of claim 5 in which $R^3$ is 2-ethyl hexyl.

7. The waterborne coating composition of claim 1 wherein the polymeric film-forming resin is water dispersible or emulsifiable and is selected from the group consisting of acrylic polymers, polyesters, alkyds, and polyurethanes.

8. The waterborne coating composition of claim 7, wherein pigment acts as a colorant for a base coat composition of a color-plus-clear composite coating.

9. The waterborne coating composition of claim 8 wherein the pigment is selected from the group consisting of metallic pigments, inorganic pigments and organic pigments.

10. The waterborne coating composition of claim 1 wherein the polymeric film-forming resin is a latex which comprises polymeric microparticles prepared by forming a mixture in aqueous medium of an ethylenically unsaturated monomer or mixture of ethylenically unsaturated monomers with greater than 30 percent by weight of a substantially hydrophobic polymer; the percent by weight being based on weight of ethylenically unsaturated monomer(s) and hydrophobic polymer; and particularizing the mixture into microparticles by high stress techniques followed by polymerizing the ethylenically unsaturated monomer(s) to form the microparticles which are stably dispersed in the aqueous medium.

11. The waterborne coating composition of claim 10 wherein the hydrophobic polymer is a polyester or a polyurethane.

12. The waterborne coating composition of claim 10 wherein the microparticles are internally crosslinked.

13. The waterborne coating composition of claim 10 further comprising a crosslinking agent.

14. A waterborne coating composition comprising a polymeric film-forming resin selected from the group consisting of water dispersible or emulsifiable acrylic polymers, polyesters, alkyds, and polyurethanes in aqueous medium in an amount in the range of about 35 to 75 percent by weight based on total weight of resin solids, pigment and from about 0.1 percent to about 10 percent by weight based on weight of total resin solids of at least one material having the following structure:

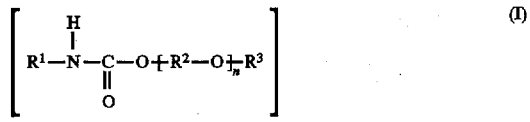

$$\left[ \begin{array}{c} H \\ | \\ R^1-N-C-O+R^2-O+_n R^3 \\ \| \\ O \end{array} \right] \quad (I)$$

where n is an integer from 1 to 3, $R^1$ is hydrogen or lower alkyl having 1 to 5 carbon atoms, $R^2$ is a divalent ethylene or methylethylene group or mixture thereof, and $R^3$ is an non-hydroxyl substituted alkyl, aryl, or alkylaryl group having 1 to 20 carbon atoms selected from the group consisting of linear aliphatic, branched aliphatic, cycloaliphatic, and aromatic alkyl groups, wherein the material of (I) is the reaction product of the transcarbamoylation reaction of a nitrogen-containing material selected from the group consisting of urea, monoisocyanate, alkyl substituted urea, or carbamate functional material and hydroxyl-containing glycol ether in an equivalence ratio of about 2:1 to 1:2.

15. The waterborne coating composition of claim 14 wherein $R^1$ is hydrogen and $R^2$ is ethylene and $R^3$ is 2-ethylhexyl and which includes a crosslinking agent and wherein the pigment is selected from the group consisting of metallic pigments, inorganic pigments and organic pigments.

16. The waterborne coating composition of claim 15 wherein the polymeric film-forming resin is a latex which comprises internally crosslinked polymeric microparticles prepared by forming a mixture in aqueous medium of an ethylenically unsaturated monomer or mixture of ethylenically unsaturated monomers with greater than 30 percent by weight of a substantially hydrophobic polymer; the percent by weight being based on weight of ethylenically unsaturated monomer(s) and hydrophobic polymer; and particularizing the mixture into microparticles by high stress techniques followed by polymerizing the ethylenically unsaturated monomer(s) to form the microparticles which are stably dispersed in the aqueous medium.

17. The waterborne coating composition of claim 1 in which $R^2$ is selected from the group consisting of linear, branched, saturated, unsaturated, divalent organic hydrocarbon radicals and is devoid of hydroxyl groups.

* * * * *